United States Patent
Han et al.

(10) Patent No.: US 11,724,603 B2
(45) Date of Patent: Aug. 15, 2023

(54) CHARGING STATION OF MOVING ROBOT AND MOVING ROBOT SYSTEM

(71) Applicant: LG ELECTRONICS INC., Seoul (KR)

(72) Inventors: Jinwoo Han, Seoul (KR); Ilsoo Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 17/036,339

(22) Filed: Sep. 29, 2020

(65) Prior Publication Data

US 2021/0107363 A1 Apr. 15, 2021

(30) Foreign Application Priority Data

Oct. 10, 2019 (KR) .................. 10-2019-0125548

(51) Int. Cl.
*B60L 50/60* (2019.01)
*A01D 34/84* (2006.01)
*B25J 13/08* (2006.01)
*B60L 1/00* (2006.01)

(52) U.S. Cl.
CPC .............. *B60L 50/60* (2019.02); *A01D 34/84* (2013.01); *B25J 13/08* (2013.01); *B60L 1/003* (2013.01)

(58) Field of Classification Search
CPC combination set(s) only.
See application file for complete search history.

(56) References Cited

U.S. PATENT DOCUMENTS

| | | | |
|---|---|---|---|
| 6,525,509 | B1 | 2/2003 | Petersson et al. |
| 9,876,370 | B2* | 1/2018 | Yamamura ........... G05D 1/0265 |
| 2013/0006418 | A1 | 1/2013 | Tian et al. |
| 2018/0081366 | A1* | 3/2018 | Tan .................... G01C 21/20 |
| 2019/0265718 | A1* | 8/2019 | Lee ..................... A01D 34/008 |
| 2020/0393844 | A1* | 12/2020 | Ritzer ................... B60L 53/36 |

FOREIGN PATENT DOCUMENTS

| | | |
|---|---|---|
| EP | 1906205 A1 | 4/2008 |
| EP | 3521965 A1 | 8/2019 |
| KR | 10-2015-0125508 A | 11/2015 |
| KR | 10-1578794 | 12/2015 |
| KR | 10-2019-0109632 | 9/2019 |
| WO | WO 2005/074362 A2 | 8/2005 |

OTHER PUBLICATIONS

European Search Report for European Patent Application No. 20198681.7, dated Mar. 9, 2021 (6 pages).
Korean Office Action for Korean Patent Application No. KR10-2019-0125548, dated Feb. 1, 2021 (6 pages).

* cited by examiner

*Primary Examiner* — Richard V Muralidar
(74) *Attorney, Agent, or Firm* — Birch, Stewart, Kolasch & Birch, LLP

(57) ABSTRACT

A charging station of a moving robot includes connection terminals provided on two surfaces so as to allow a boundary wire, that defines a boundary of a travel area of the moving robot, to be connected thereto. The charging station has a charging unit to charge the moving robot and a docking base to dock the moving robot during charging. The charging unit includes the connection terminals.

18 Claims, 11 Drawing Sheets

CHARGING STATION OF MOVING ROBOT AND MOVING ROBOT SYSTEM

CROSS-REFERENCE TO RELATED APPLICATION

Pursuant to 35 U.S.C. § 119(a), this application claims the benefit of the earlier filing date and the right of priority to Korean Patent Application No. 10-2019-0125548, filed on Oct. 10, 2019, the contents of which are incorporated by reference herein in its entirety.

BACKGROUND

1. Technical Field

The preset disclosure relates to a charging station of a moving robot that mows a lawn in a travel area while traveling, and a moving robot system.

2. Description of the Related Art

Generally, a moving robot is a device that automatically performs a predetermined operation while traveling by itself in a predetermined area without a user's operation. The moving robot senses obstacles located in the area and performs its operations by moving close to or away from such obstacles.

Such a moving robot may include a cleaning robot that carries out cleaning while traveling in an area, as well as a lawn mowing robot that mows a lawn on a bottom of the area. Generally, lawn mowing devices (or lawn mower) include a riding-type device on which a user rides and which moves according to a user's operation to cut a lawn or perform weeding, and a work-behind type or hand type device that is manually pushed or pulled by the user and moves and cuts a lawn. As the lawn mowing devices move and cut a lawn according to direct manipulation by a user, the user may inconveniently operate the device directly. Accordingly, researches have been conducted on a moving robot-type mowing device including elements that cuts a lawn. However, since a lawn mowing robot operates outdoors as well as indoors, there is a need to set an area in which the lawn mowing robot is to move. In detail, since an outdoor area is an open space unlike an indoor area, the area in which the lawn mowing robot is to move needs to be designated in the outdoor area in advance, and the area needs to be limited so that the lawn mowing robot travels in a place in which the lawn is planted.

A moving robot for lawn mowing is disclosed in Korean Laid-Open Patent Application No. KR10-2015-0125508, published on Nov. 9, 2015 and hereinafter, referred to as "Patent Document 1", which is hereby incorporated by reference. In the moving robot for lawn mowing disclosed in Patent Document 1, a wire is buried where grass is planted to set or designate a travel area of the moving robot, so that the moving robot is controlled to move within the wire. Then, a boundary for the moving robot is set based on a current value (or voltage value) induced by the wire, and the moving robot senses the current value induced by the wire to recognize a boundary of the travel area based on a sensing result, allowing the moving robot to travel within an area of the wire.

Such a wire is connected to a charging station that (re)charges a moving robot so as to receive a current from the charging station. As illustrated in FIGS. 1 and 2, the charging station has a positive terminal (+pole) and a negative terminal (−pole) to be connected to a wire. As the wire also have polarity, the positive end of wire should be connected to the positive terminal and the negative end of wire should be connected to the negative terminal. If the wire and the terminals are not correctly connected as shown in FIG. 2, a traveling direction of the moving robot that travels based on a current flowing in the wire does not match an operation reference, causing an error while traveling. In particular, when an error occurs while the moving robot travels for generating map information after an initial installation of the charging station and the wire, the map information may be incorrectly generated, which may adversely affect future traveling.

However, in the related art charging station, a polarity of the terminals is not clearly indicated, a user may have difficult in distinguishing it when connecting a wire. As a result, incorrect polarity connection of the wire may be highly likely to occur, as illustrated in FIG. 2. If the wire is connected to the wrong terminal of the charging station, a direction of current induced in the wire is changed, and thus problems such as recognition by the robot and traveling operation may occur as the robot senses a boundary by sensing a current induced in the wire. For example, as illustrated in FIGS. 3A and 3B, a traveling direction of the robot is not performed in a counterclockwise direction, which is set as default, and may be performed in a clockwise direction. Or the boundary may not be clearly distinguished (in/out) as shown in FIG. 3C. In particular, when map information is generated based on recognition and traveling results, the map information is incorrectly generated due to an incorrect recognition result, which may in turn adversely affect the overall operation of the robot. This may also cause the robot to be inaccurately or improperly docked with the charging station, leading to unstable charging.

In other words, since the polarity of the terminals of the charging station are not clearly indicated, there is a possibility of incorrect connection of the wire to the charging station, and a high possibility of causing a problem in the overall operation of the robot. However, in the related art, a method or technique for solving such a problem is not presented, and miswiring can only be prevented by the user's attention. Accordingly, in the related art moving robot technology, difficulties and inconveniences are caused in establishing an environment for using the robot, and there is a limit in ensuring stability, accuracy, and reliability of robot operation.

SUMMARY

The present disclosure describes a charging station of a moving robot and a moving robot system capable of solving the aforementioned problems and other drawbacks.

That is, the present disclosure describes a charging station of a moving robot capable of preventing miswiring of a boundary wire connected to the charging station, and a moving robot system.

The present disclosure also describes a charging station of a moving robot capable of allowing connection of a boundary wire and the charging station to be clearly indicated, and a moving robot system.

The present disclosure also describes a charging station of a moving robot that can easily form a boundary of a travel area, and a moving robot system.

The present disclosure also describes a charging station of a moving robot that can allow the moving robot to be accurately docked with the charging station, and a moving robot system.

In order to solve such problems described above, an aspect of the present disclosure is to provide a charging station of a moving robot and a moving robot system, wherein connection terminals of the charging station to which a boundary wire is connected are divided.

In detail, the connection terminals of the charging station are provided at surfaces of different directions, so as to allow the boundary wire to be connected to the connection terminals in different directions.

That is, in the charging station of the moving robot and the moving robot system, the connection terminals are respectively provided at any two surfaces of the charging station, allowing the boundary wire to be connected thereto.

The technical features herein may be embodied as a charging station of a moving robot and a moving robot system including a charging station of the moving robot. In this specification, embodiments of the charging station of the moving robot and the moving robot system using the above-described technical features are provided.

Embodiments disclosed herein provide a charging station of a moving robot that may include a charging unit configured to charge the moving robot, a docking base at which the moving robot is docked, and a connecting portion to which one end and another end of a boundary wire that defines a boundary of a travel area are connected, so as to cause a current to be induced in the boundary wire, so as to cause a current induced in the boundary wire. The connection portion may include a first terminal provided a first surface of the docking base so as to allow the one end of the boundary wire to be connected thereto and a second terminal provided at a second surface of the docking base so as to allow the another end of the boundary wire to be connected thereto.

Embodiments disclosed herein also provide a moving robot system that may include a boundary wire installed along a travel area to define the boundary of the travel area, a charging station to which one end and another end of the boundary wire are connected, so as to cause a current to be induced in the boundary wire, and a moving robot that travels in the travel area based on a result of sensing the current while traveling. The one end and the another end of the boundary wire may be connected to the charging station in different directions.

The effects of the embodiments disclosed herein include but are not limited to the following. In some implementations, connection terminals of a charging station may be provided at different sides of the charging station so as to allow one end and another end of a boundary wire to be connected to the different sides of the charging station. Accordingly, the charging station and the boundary wire may be connected in an easily indicatable manner.

In some implementations, the charging station and the boundary wire may be installed in a simpler and easier manner, thereby allowing the charging station and the boundary wire to be easily installed.

As the charging station and the boundary wire are easily connected to each other, usage environment may be easily changed, or reinstallation may be easily performed.

Accordingly, an environment for using the moving robot may be conveniently established, thereby improving installation and usage convenience.

In some implementations, as the charging station and the boundary wire are connected in an easily indicatable manner, miswiring of the boundary wire to the charging station may be prevented.

Accordingly, the charging station and the boundary wire may be properly installed, allowing a travel area to be properly set and operation of the moving robot to be accurately performed.

In some implementations, the charging station has an inner structure in which the connection terminals are located at different directions, allowing the moving robot to be accurately docked with the charging station.

Therefore, the embodiments disclosed herein may not only solve the above-identified problems of the related art, but also increase usability, safety, reliability, and convenience of the moving robot.

DETAILED DESCRIPTION

Figure 1:
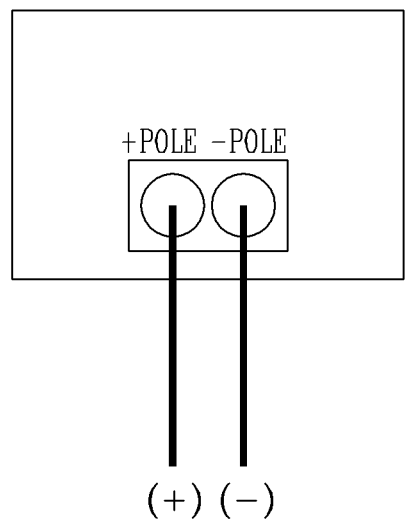
FIG. 1 is a diagram illustrating an example of a connection state between a wire and a terminal of a charging station of a moving robot.
Figure 2:
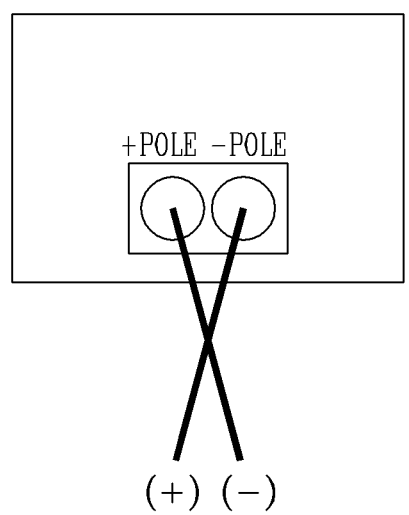
FIG. 2 is a diagram illustrating another example of a connection state between a wire and a terminal of a charging station of a moving robot.
Figure 3A:
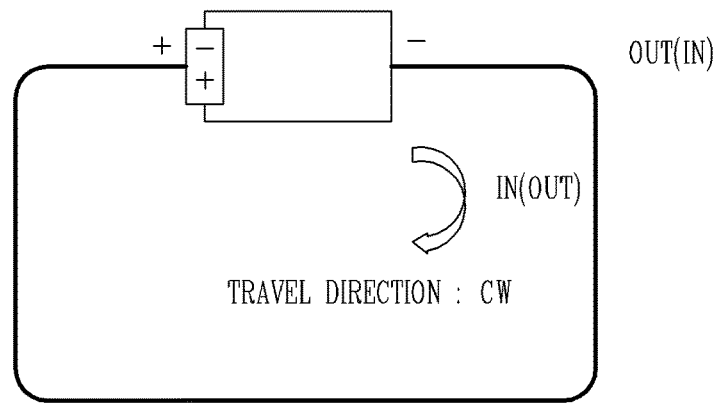
FIG. 3A is a diagram illustrating an example of miswiring between a wire and a terminal of a charging station of a moving robot.
Figure 3B:
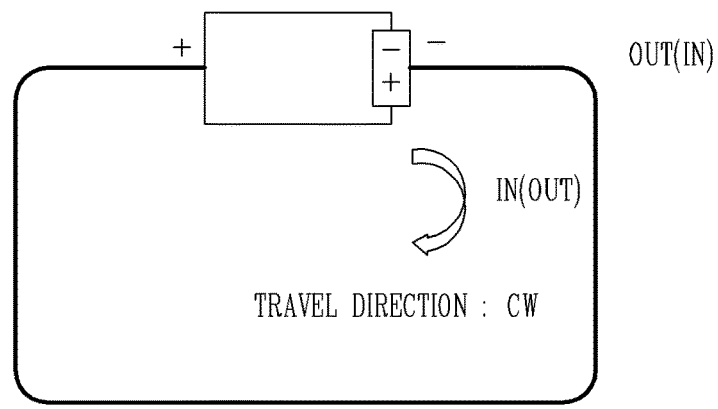
FIG. 3B is a diagram illustrating another example of miswiring between a wire and a terminal of a charging station of a moving robot.
Figure 3C:
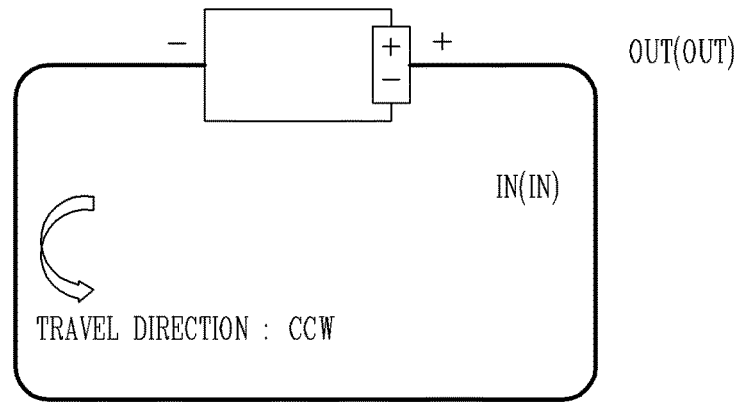
FIG. 3C is a diagram illustrating yet another example of miswiring between a wire and a terminal of a charging station of a moving robot.

Hereinafter, embodiments of a charging station of a moving robot and a moving robot system will be described in detail with reference to the accompanying drawings, and the same reference numerals are used to designate the same/like components and redundant description thereof will be omitted.

In describing technologies disclosed herein, if a detailed explanation for a related known function or construction is considered to unnecessarily divert the main point of the present disclosure, such explanation has been omitted but would be understood by those skilled in the art. It should be noted that the attached drawings are provided to facilitate understanding of the embodiments disclosed in this specification, and should not be construed as limiting the technical idea disclosed in this specification by the attached drawings.

First, a moving robot (hereinafter referred to as a "robot") according to the present disclosure is described.

Figure 4A:
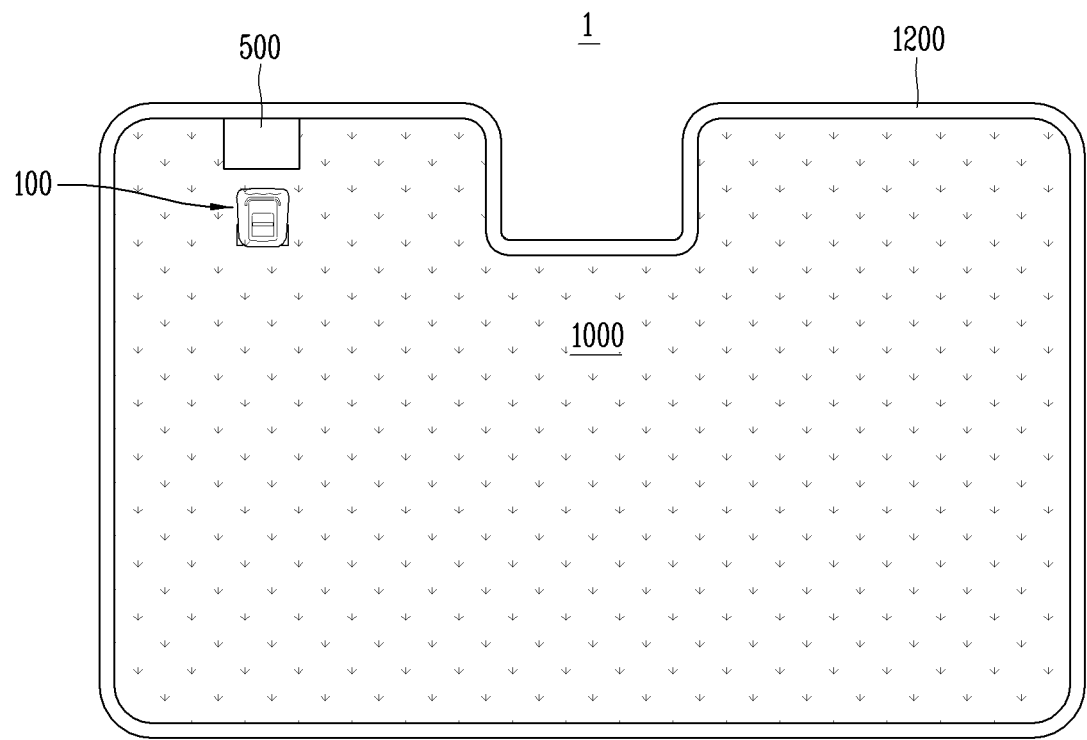
FIG. 4A is a diagram illustrating one example of a moving robot system.

A robot 100 may refer to a robot capable of autonomous traveling, a lawn-mowing moving robot, a lawn mowing robot, a lawn mower, or a moving robot for lawn mowing. As illustrated in FIG. 4A, the robot 100 travels in a travel area 1000 that is set, and cuts a lawn in the travel area 1000. The robot 100 may operate based on driving power (re) charged by a charging station 500 provided in the travel area 1000 so as to cut a lawn while traveling in the travel area 1000. When the robot 100 that operates based on driving power charged by the charging station 500 travels in the travel area 1000, and then moves to the charging station 500, the robot 100 may receive a transmission signal transmitted from a signal transmission module included in the charging station 500, and move to the charging station 500 based on a reception result obtained by receiving the transmission signal. The charging station 500 may include one or more signal transmission modules to respectively transmit the transmission signal.

Figure 4B:
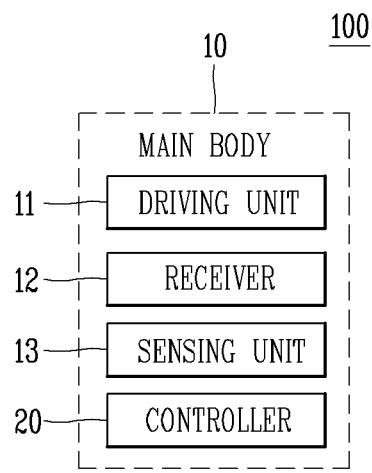
FIG. 4B is a block diagram illustrating a configuration of a moving robot.

As illustrated in FIG. 4B, the robot 100 includes a main body 10, a driving (or drive) unit 11 that moves the main body 10, a receiver (or receiving unit) 12 that receives the transmission signal transmitted from the charging station 500 provided in the travel area 1000, a sensing unit 13 that senses a current by sensing at least one of an electric field and a magnetic field around the main body 10, and a controller 20 that controls the driving unit 11 to control traveling of the main body 10 such that the main body 10 travels in the travel area 1000, based on at least one selected from the reception result obtained by the receiver 12, a sensing result obtained by the sensing unit 13, and an area map that is pre-stored.

That is, as the controller 20 controls the driving unit 11 to travel in the travel area 1000 based on at least one selected from the reception result obtained by the receiver 12, the sensing result obtained by the sensing unit 13, and the area map, the robot 100 travels in the travel area 1000.

For example, the sensing unit 13 senses a magnetic field of a boundary wire 1200 defining a boundary of the travel area 1000, and senses a current flowing in the boundary wire 1200 based on a sensing result. As the controller 20 recognizes the boundary wire 1200, namely the boundary of the travel area 1000 based on the current sensing result by the sensing unit 13, the controller 20 may control the driving unit 11 such that the robot 100 travels within the travel area 100.

Using this control method of traveling, the controller 20, after initial installation of the boundary wire 1200, controls the robot 100 to travel along the boundary wire 1200, and generates an area map of the travel area 1000 based on a result of sensing the current flowing in the boundary wire 1200.

In the robot 100 that includes the main body 10, the driving unit 11, the receiver 12, the sensing unit 13, and the controller 20, when the controller 20 controls the main body 10 to move to the charging station 500, the controller 20 determines a direction in which the charging station 500 is located based on the reception result obtained at a current position (or location) of the main body 10, determines a traveling direction of the main body 10 based on the sensing result obtained at the current position, and controls the main body 10 to move to the charging station 500 according to a result of the determination as to the direction in which the charging station 500 is located and the traveling direction.

That is, when the robot 100 moves to the charging station 500 after traveling in the travel area 1000, the robot 100 determines a direction in which the charging station 500 is located based on the reception result and determines a traveling direction of the robot 100 based on the sensing result. Thus, according to a result of the determination as to the direction in which the charging station 500 is located and the traveling direction, the robot 100 changes the traveling direction to the direction in which the charging station 500 is located, and move to the charging station 500.

When the main body 10 is controlled to move to the charging station 500, the controller may 20 may sense a current induced from the charging station 500 upon being near the charging station 500, so that the main body 10 is docked at the charging station 500.

That is, as the main body 10 moves to the charging station 500 based on a result of sensing the current induced in an electric wire (or cable) that is embedded in the charging station 500, the robot 100 may accurately dock with the charging station 500.

Figure 4C:
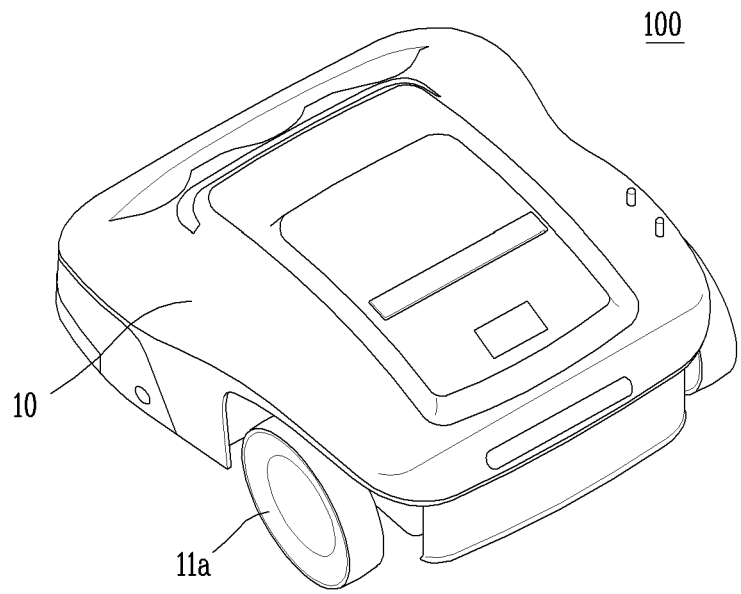
FIG. 4C is a diagram illustrating an example of a moving robot.
Figure 4D:
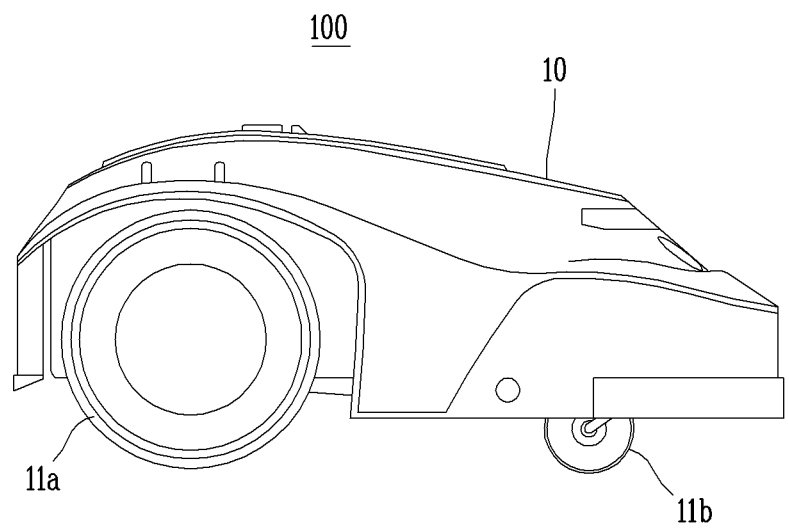
FIG. 4D is a diagram illustrating another example of a moving robot.

As illustrated in FIGS. 4C and 4D, the robot 100 may be an autonomous traveling robot configured to be movable and having the main body 10 capable of cutting a lawn. The main body 10 defines an outer appearance of the robot 100 and includes one or more elements to perform operations such as traveling of the robot 100, cutting a lawn, etc. The main body 10 includes the driving unit 11 that may move the main body 10 in a desired direction and rotate the main body 10. The driving unit 11 may include a plurality of rotatable driving wheels. Each of the driving wheels may individually rotate so as to allow the main body 10 to rotate in a desired direction. In detail, the driving unit 11 may include at least one main driving wheel 11a and an auxiliary wheel 11b. For example, the main body 10 may include two main driving wheels 11a, and the two main driving wheels 11a may be installed at a rear lower surface of the main body 10. The main body 10 may include the receiver 12. The receiver 12 may include a signal sensor module that receives the transmission signal transmitted from the charging station 500. That is, the receiver 12 may be configured as the signal sensor module. Accordingly, the signal sensor module may receive a transmission signal transmitted from the signal transmission module.

Figure 5:
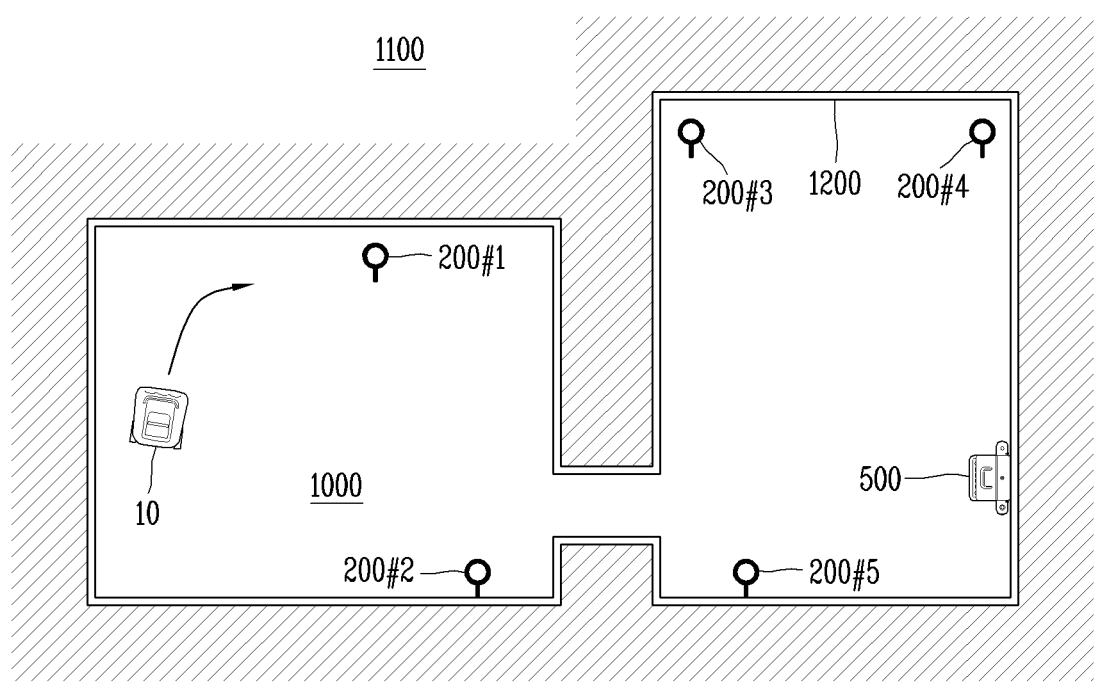
FIG. 5 is a schematic view illustrating one example of a travel area of a moving robot system according to an embodiment.

The robot 100 may travel by itself in the travel area 1000 in FIG. 5. The robot 100 may perform a particular operation during traveling. Here, the particular operation may be an operation of cutting a lawn in the travel area 1000. The travel area 1000 is an area corresponding to a target location in which the robot 100 is to travel and operate. A predetermined outside/outdoor area may be formed as the travel area 1000. For example, a garden, a yard, or the like in which the robot 100 is to cut a lawn may be defined as the travel area 1000. The charging station 500 by which driving power of the robot 100 is charged may be installed at one point of the travel area 1000. The robot 100 may be (re)charged with driving power by docking at the charging station 500 installed in the travel area 1000.

The travel area 1000 may be formed as a predetermined boundary area 1200, as illustrated in FIG. 5. The boundary area 1200 corresponds to a boundary line between the travel area 1000 and an outside area 1100 so that the robot 100 travels in the boundary area 1200 and does not deviate from the outside area 1100. In this case, the boundary area 1200 may be formed in a closed curved shape or a closed loop shape. Also, in this case, the boundary area 1200 may be defined by the boundary wire 1200 formed in a closed curve or a closed loop. The boundary wire 1200 may be installed in an arbitrary area. The robot 100 may travel in the travel area 1000 having a closed curved shape formed by the boundary wire 1200 that is installed.

As illustrated in FIG. 5, transmitters 200 may be provided in the travel area 1000. More than one transmitter 200 may be provided in the travel area 1000. At least three transmitters 200 may be preferably disposed in a distributed manner. The transmitter 200 is a signal generation element that transmits a signal via which the robot 100 determines position information. The at least three transmitters 200 may be installed in the travel area 1000 in a distributed manner. The robot 100 may receive a signal transmitted from the transmitter 200, and determine a current position based on a reception result or determine position information regarding the travel area 1000. In this case, the receiver 12 in the robot 100 may receive the transmitted signal. The transmitter 200 may preferably be disposed in a periphery of the boundary area 1200 of the travel area 1000. In this case, the robot 100 may determine the boundary area 1200 based on a position of the arrangement of the transmitter 200 in the periphery of the boundary area 1200. The transmitter 200 may include an inertial measurement unit (IMU) sensor that detects posture information of the transmitter 200. The IMU sensor is a sensor including at least one selected from a gyro sensor, an acceleration sensor, and an altitude sensor. The IMU sensor may be a sensor that senses posture information of the transmitter 200. Accordingly, the transmitter 200 may sense the posture information according to a present arrangement state via the IMU sensor. Further, when a posture is changed according to a change of a position, the transmitter 200 may sense the change of the posture according to the change of the position via the IMU sensor.

Figure 6A:
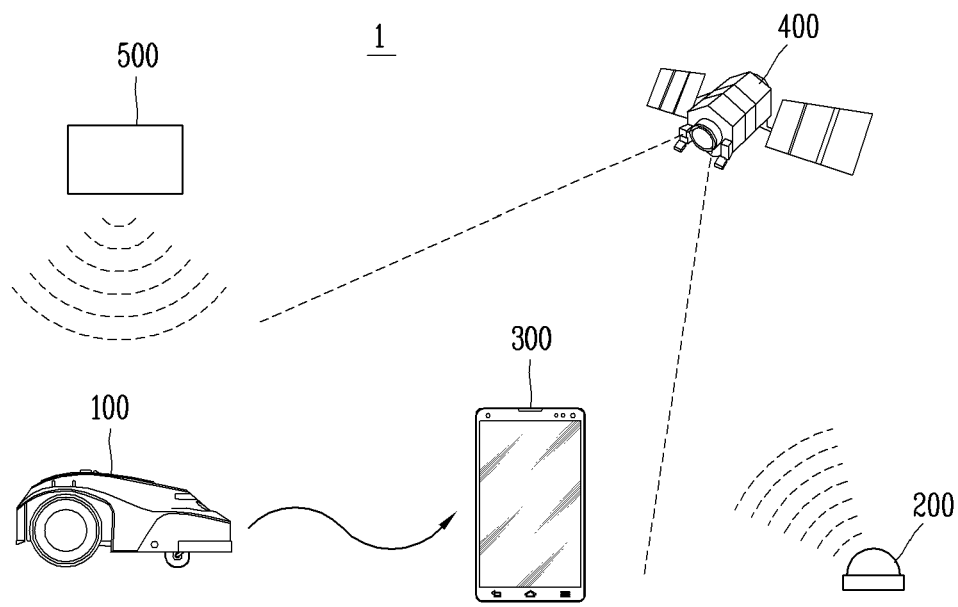
FIG. 6A is a schematic view illustrating a traveling principle of a moving robot system according to an embodiment.
Figure 6B:
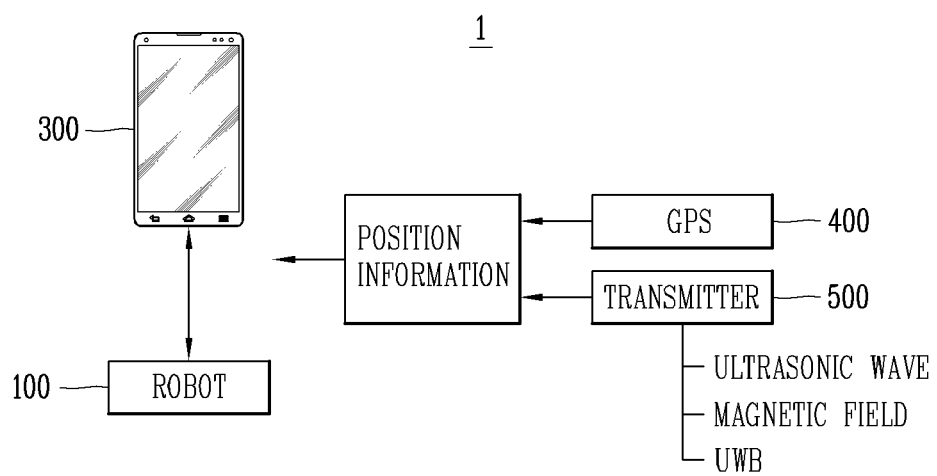
FIG. 6B is a schematic view illustrating a signal flow between devices for determining a position of the moving robot system according to an embodiment.

The robot 100 that cuts a lawn while traveling in the travel area 1000 as shown in FIG. 5 may operate according to a traveling principle of FIG. 6A, and a signal may flow between devices to determine a position as shown in FIG. 6B.

As illustrated in FIG. 6A, the robot 100 may communicate with a terminal 300 moving in a predetermined area, and travel by following a position of the terminal 300 based on data received from the terminal 300. The robot 100 may set a virtual boundary in a predetermined area based on position information received from the terminal 300 or collected while the robots 100 is traveling by following the terminal 300, and set an internal area formed by the virtual boundary as the travel area 1000. When the boundary area 1200 and the travel area 1000 are set, the robot 100 may travel in the travel area 1000 such that the robot 100 does not deviate from the boundary area 1200. According to cases, the terminal 300 may set the boundary area 1200 and transmit the boundary area 1200 to the robot 100. When the terminal 300 changes or expands an area, the terminal 300 may transmit changed information to the robot 100 so that the robot 100 may travel in a new area. Also, the terminal 300 may display data received from the robot 100 on a screen to monitor operation of the robot 100.

The robot 100 or the terminal 300 may determine a current position by receiving position information. The robot 100 and the terminal 300 may determine a current position of the robot 100 based on the plurality of transmission signals transmitted from the charging station 500 or a global positioning system (GPS) signal obtained using a GPS satellite 400. For example, a distance between the robot 100 and the charging station 500 may be measured based on reception strength, a reception direction, reception time, or the like of the plurality of transmission signals. Then, based on the measured distance, a current position of the robot 100 may be determined by determining a position of the charging station 500 in the travel area 100. Alternatively, the GPS satellite 400 may receive a GPS signal transmitted from the GPS module in the charging station 500 and determine a current position of the charging station 500 based on the GPS signal to thereby determine the current position of the robot 100.

In addition, when the transmitter 200 is provided in the travel area 1000, the robot 100 and the terminal 300 may determine a current position based on a signal for position information transmitted from the transmitter 200. Here, when signals are received from a plurality of transmitters 200, positions of the robot 100 and the plurality of transmitters 200 may be determined by comparing results of the reception as to the signals from the plurality of transmitters 200 with each other, respectively. Alternatively, a current position of the robot 100 may be determined by receiving a GPS signal transmitted from the GPS module included in the transmitter 200 and determining a position of the transmitter 200 based on the GPS signal. In addition, positions of the robot 100 and the plurality of transmitters 200 may be accurately determined by determining distances between the plurality of transmitters 200 based on a position of each of the plurality of transmitters 200. The robot 100 and the terminal 300 may preferably determine a current position by receiving signals transmitted from three transmitters 200 and comparing the signals with each other. That is, three or more transmitters 200 may be preferably provided in the travel area 1000.

The robot 100 sets one certain point in the travel area 1000 as a reference position, and then, calculates a position of the robot 100 as a coordinate while the robot 100 is moving. For example, an initial starting position of the robot 100, namely, a position of the charging station 500 may be set as a reference position. Alternatively, a position of one of the transmitters 200 may be set as a reference position to calculate a coordinate in the travel area 1000. The robot 100 may also set an initial position of the robot 100 as a reference position in each operation, and then, determine a position of the robot 100 while the robot 100 is traveling. With reference to the reference position, the robot 100 may calculate a traveling distance based on the number of rotations and a rotational speed of the driving unit 11, a rotation direction of the main body 10, etc. to thereby determine a current position of the robot 100 in the travel area 1000. Even when the robot 100 determines a position of the robot 100 using the GPS satellite 400, the robot 100 may determine the position of the robot 100 using a certain point as a reference position.

As illustrated in FIG. 6B, the robot 100 may determine a current position of the robot 100 based on position information transmitted from the GPS satellite 400 or the charging station 500. The position information may be transmitted in the form of a GPS signal, an ultrasound signal, an infrared signal, an electromagnetic signal, or an ultra-wideband (UWB) signal. A transmission signal transmitted from the charging station 500 may preferably be a UWB signal. That is, the transmission signal may be a UWB signal transmitted from the signal transmission module in the charging station 500. Accordingly, the robot 100 may receive the UWB signal transmitted from the charging station 500, and determine a current position of the robot 100 based on the UWB signal. The charging station 500 may also include the GPS module to transmit a GPS signal. In this case, the GPS signal transmitted from the charging station 500 may be received by the GPS satellite 400. Then, the GPS satellite 400 may transmit a reception result of the GPS signal received from the charging station 500 to the robot 100.

Figure 7:
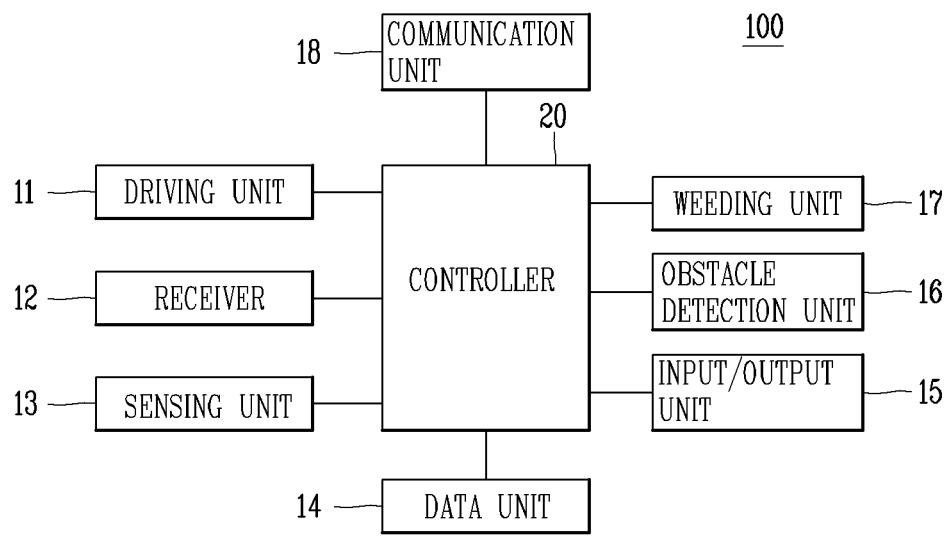
FIG. 7 is a block diagram illustrating a specific configuration of a moving robot according to an embodiment.

As illustrated in FIG. 7, the robot 100 operating as described above may include the main body 10, the driving unit 11, the receiver 12, the sensing unit 13, and the controller 20, and travel in the travel area 1000 based on the reception result obtained by the receiver 12, the sensing result obtained by the sensing unit 13, and the area map. Also, the robot 100 may further include at least one selected from a data unit 14, an input/output unit 15, an obstacle detection unit 16, a weeding unit 17, and a communication unit 18.

The driving unit 11 is a driving wheel included in a lower part of the main body 10, and may be rotatably driven to move the main body 10. That is, the driving unit 11 may drive the main body 10 to travel in the travel area 1000. The driving unit 11 may include at least one driving motor to move the main body 10 so that the robot 100 travels. For example, the driving unit 11 may include a left wheel driving motor for rotating a left wheel and a right wheel drive motor for rotating a right wheel.

The driving unit 11 may transmit information about a result of the driving to the controller 20, and receive a control command for operation from the controller 20. The driving unit 11 may operate according to the control command received from the controller 20. That is, the driving unit 11 may be controlled by the controller 20.

The receiver 12 may include a signal sensor module for transmitting and receiving the transmission signal. The signal sensor module may be provided at a position of the main body 10 in which the transmission signal may be received, and receive the transmission signal from the charging station 500. The signal sensor module may transmit a signal to the charging station 500. When the charging station 500 transmits a signal using a method of using one selected from an ultrasound signal, a UWB signal, and an infrared signal, the receiver 12 may include a sensor module that transmits and receives an ultrasound signal, a UWB signal, or an infrared signal, in correspondence with this. The receiver 12 may preferably include a UWB sensor. As a reference, UWB radio technology refers to technology using a very wide frequency range of several GHz or more in baseband instead of using a radio frequency (RF) carrier. The UWB radio technology uses very narrow pulses of several nanoseconds or several picoseconds. Since pulses emitted from such a UWB sensor are several nanoseconds or several picoseconds long, the pulses have good penetrability. Thus, even when there are obstacles in a periphery of the receiver 12, the receiver 12 may receive very short pulses emitted by another UWB sensor.

When the robot 100 travels by following the terminal 300, the terminal 300 and the robot 100 each having a UWB sensor may transmit and receive UWB signals with each other through the UWB sensor. The terminal 300 may transmit the UWB signal to the robot 100 through the UWB sensor included in the terminal 300. The robot 100 may determine a position of the terminal 300 based on the UWB signal received through the UWB sensor, so as to move by following the terminal 300. In this case, the terminal 300 operates as a transmitting side and the robot 100 operates as a receiving side. When the transmitter 200 includes the UWB sensor and transmits a signal, the robot 100 or the terminal 300 may receive the signal transmitted from the transmitter 200 through the UWB sensor included in the robot 100 or the terminal 300. In this case, a signaling method performed by the transmitter 200 may be identical to or different from that by the robot 100 or the terminal 300.

The receiver 12 may include one or more UWB sensors. That is, the signal sensor module may be a UWB sensor. The receiver 12 may receive a plurality of signals transmitted in a plurality of directions from the main body 10 and compare the plurality of received signals with each other to thereby accurately calculate a position of the robot 100. For example, according to a position of the robot 100, the charging station 500, or the terminal 300, when a measured distance with respect to a signal received from a left side is different from a signal received from a right side, relative positions of the robot 100, the charging station 500 or the terminal 300 and a direction of the robot 100 may be determined based on the measured distances.

The receiver 12 may transmit a reception result with respect to the transmitted signals to the controller 20, and receive a control command for operation from the controller 20. The receiver 12 may operate according to the control command received from the controller 20. That is, the receiver 12 may be controlled by the controller 20.

The sensing unit 13 may include one or more sensors for sensing information on the posture and motion of the main body 10. The sensing unit 13 may include at least one sensor that senses a magnetic field state in a periphery of the main body 10. Here, the at least one sensor may include a magnetic field sensor. That is, the sensing unit 13 may include at least one magnetic field sensor to sense a magnetic field state at a point in which the main body 10 is located. For example, the sensing unit 13 may sense at least one selected from a magnetic field direction and magnetic field strength in a periphery of the main body 10. The sensing unit 13 may further include at least one selected from an inclination sensor that detects movement of the main body 10 and a speed sensor that detects a driving speed of the driving unit 11. The inclination sensor may be a sensor that senses posture information of the main body 10. When the inclination sensor is inclined forward, backward, leftward or rightward against the main body 10, the inclination sensor may sense the posture information of the main body 10 by calculating an inclined direction and an inclination angle. A tilt sensor, an acceleration sensor, or the like may be used as the inclination sensor. In the case of the acceleration sensor, any one selected from a gyro type sensor, an inertial type sensor, and a silicon semiconductor type sensor may be adopted. In addition, various sensors or devices capable of detecting movement of the main body 10 may be used. The sensing unit 13 including such an inclination sensor may sense a magnetic field state through the inclination sensor. The speed sensor may be a sensor that senses a driving speed of a driving wheel in the driving unit 11. When the driving wheel rotates, the speed sensor may sense the driving speed by detecting rotation of the driving wheel.

The sensing unit 13 may transmit information about a result of the sensing to the controller 20, and receive a control command for operation from the controller 20. The sensing unit 13 may operate according to a control command received from the controller 20. That is, the sensing unit 13 may be controlled by the controller 20.

The data unit 14 is a storage element that stores data readable by a microprocessor, and may include a hard disk drive (HDD), a solid state disk (SSD), a silicon disk drive (SDD), a read only memory (ROM) a random access memory (RAM), CD-ROM, a magnetic tape, a floppy disk, or an optical data storage device. In the data unit 14, a received signal may be stored, reference data to determine an obstacle may be stored, and obstacle information regarding a detected obstacle may be stored. In the data unit 14, control data that controls operation of the robot 100, data according to an operation mode of the robot 100, collected position information, and information about the travel area 1000 and its boundary area 1200 may be stored.

The input/output unit 15 may include input elements such as at least one of a button, a switch, a touch pad, or the like, and output elements such as a display unit, a speaker, or the like to receive a user command and output an operation state of the robot 100.

The input/output unit 15 may transmit information about the operation state to the controller 20 and receive a control command for operation from the controller 20. The input/output unit 15 may operate according to a control command received from the controller 20. That is, the input/output unit 15 may be controlled by the controller 20.

The obstacle detection unit 16 includes a plurality of sensors to detect obstacles in a traveling direction. The obstacle detection unit 16 may detect an obstacle located in front of the main body 10, that is, in a traveling direction of the main body 10 using at least one selected from a laser sensor, an ultrasound sensor, an infrared sensor, and a three-dimensional (3D) sensor. The obstacle detection unit 16 may further include a cliff detection sensor installed at a rear surface of the main body 10 to detect a cliff.

In addition, the obstacle detection unit 16 may include a camera for detecting an obstacle by photographing a front. The camera is a digital camera, and may include an image sensor (not shown) and an image processing unit (not shown). An image sensor is a device that converts an optical image into an electrical signal. The image sensor includes a chip in which a plurality of photodiodes is integrated. A pixel may be an example of a photodiode. Charges are accumulated in each of pixels by an image formed on a chip by the light passing through the lens, and the charges accumulated in each of the pixels are converted into an electrical signal (e.g., a voltage). A charge-coupled device (CCD) sensor and a complementary metal oxide semiconductor (CMOS) sensor are well known as image sensors. In addition, the camera may include an image processing unit (a digital signal processor (DSP)) for processing a captured image.

The obstacle detection unit 16 may transmit information about a result of the detection to the controller 20, and receive a control command for operation from the controller 20. The obstacle detection unit 16 may operate according to the control command received from the controller 20. That is, the obstacle detection unit 16 may be controlled by the controller 20.

The weeding unit 17 cuts grass on a bottom while traveling. The weeding unit 17 includes a brush or a blade for lawn mowing, so as to mow a lawn on the bottom through rotation.

The weeding unit 17 may transmit information about a result of operation to the controller 20 and receive a control command for the operation from the controller 20. The weeding unit 17 may operate according to a control command received from the controller 20. That is, the weeding unit 17 may be controlled by the controller 20.

The communication unit 18 may communicate with a communication device that is to communicate with the robot 100, using a wireless communication method. For example, the communication unit 13 may communicate with at least one selected from the transmitter 200, the terminal 300, and the GPS satellite 400. The communication unit 18 is connected to a predetermined network and may communicate with an external server or the terminal 300 that controls the robot 100. When the communication unit 18 communicates with the terminal 300, the communication unit 18 may transmit a generated map to the terminal 300, receive a command from the terminal 300, and transmit data regarding an operation state of the robot 100 to the terminal 300. The communication unit 18 may include a communication module such as a wireless fidelity (Wi-Fi) module, a wireless broadband (WiBro) module, or the like, as well as a short-range wireless communication module such as Zigbee, Bluetooth, or the like, to transmit and receive data. The communication unit 18 may communicate with the GPS satellite 400 via the terminal 300 that communicates with the GPS satellite 400. In addition, the communication unit 18 may further include a GPS module that transmits and receives a GPS signal to/from the GPS satellite 400 to communicate with the GPS satellite 400. When the communication unit 18 communicates with the GPS satellite 400, the GPS satellite 400 may receive GPS signals transmitted from at least one transmitter 200 provided in the travel area 1000 or the charging station 500, and transmit a result of the reception as to the GPS signals to the communication unit 18. That is, when the communication unit 18 communicates with the GPS satellite 400 that receives a GPS signal from the transmitter 200 or the charging station 500, the communication unit 18 may receive a result of the reception as to the GPS signal from the GPS satellite 400.

The communication unit 18 may transmit information about a result of the communication to the controller 20, and receive a control command for operation from the controller 20. The communication unit 18 may operate according to the control command received from the controller 20. That is, the communication unit 18 may be controlled by the controller 20.

The controller 20 may perform overall operation control of the robot 100, including a central processing unit. The controller 20 may include a central processing unit to control all operations of the robot 100. The controller 20 may determine position information in the travel area 1000 via the receiver 12 and the sensing unit 13 to thereby control the main body 10 to travel in the travel area 1000 via the driving unit 11. The controller 20 may also control the robot 100 to perform functions/operations via the data unit 14, the input/ output unit 15, the obstacle detection unit 16, the weeding unit 17, and the communication unit 18.

The controller 20 may control input/output of data and control the driving unit 11 such that the main body 10 travels according to settings. The controller 20 may independently control operations of the left wheel driving motor and the right wheel driving motor by controlling the driving unit 11 to thereby control the main body 10 to travel rotationally or in a straight line.

The controller 20 may set the boundary area 1200 of the travel area 1000 based on position information received from the terminal 300 or position information determined based on the transmitted signal received from the charging station 500. The controller 20 may also set the boundary area 1200 of the travel area 1000 based on position information that is collected by the controller 20 during traveling. The controller 20 may set a certain area of a region formed by the set boundary area 1200 as the travel area 1000. The controller 20 may set the boundary area 1200 in a closed loop form by connecting discontinuous position information using a line or a curve, and set an inner area within the boundary area 1200 as the travel area 1000. When the travel area 1000 and the boundary area 1200 corresponding thereto are set, the controller 20 may control traveling of the main body 10 so that the main body 10 travels in the travel area 1000 and does not deviate from the set boundary area 1200. The controller 20 may determine a current position based on received position information and control the driving unit 11 such that the determined current position is located in the travel area 1000 to thereby control traveling of the main body 10.

In addition, according to obstacle information input by the obstacle detection unit 16, the controller 20 may control traveling of the main body 10 to avoid obstacles. In this case, the controller 20 may reflect the obstacle information in pre-stored area information regarding the travel area 1000 to thereby modify the travel area 1000.

The robot 100 having a configuration shown in FIG. 7 may travel in the travel area 1000, as the controller 10 determines a current position of the main body 10 based on at least one selected from a reception result obtained by the receiver 12, a sensing result obtained by the sensing unit 18, a communication result obtained by the communication unit 18, and the area map that is pre-stored, and controls the driving unit 11 such that the main body 10 travels in the travel area 1000.

While the robot 100 travels in the travel area 1000 shown in FIG. 4A, the robot 100 may perform set operations. For example, while the robot 100 is traveling in the travel area 1000, the robot 100 may cut a lawn on a bottom of the travel area 1000.

In the robot 100, the main body 10 may travel as the driving unit 11 is driven. The main body 10 may travel as the driving unit 11 is driven to move the main body 10.

In the robot 100, the driving unit 11 may move the main body 10 by driving wheels. The driving unit 11 may move the main body 10 by driving the driving wheels so as to allow the main body 10 to perform traveling.

In the robot 100, the receiver 12 may receive at least one transmission signal transmitted from the charging station 500 provided in the travel area 1000, while the robot 100 is traveling. Here, the charging station 500 may transmit and receive the at least one transmission signal via the at least one transmission module. The receiver 12 may include the signal sensor module to thereby receive the at least one transmission signal. While the main body 10 is traveling in the travel area 1000, the receiver 12 may receive the at least one transmission signal in real time. That is, a reception result obtained by receiving the at least one transmission signal may vary depending on a position (or location) in which the at least one transmission signal is received, that is, a position of the main body 10. Here, the transmission signal transmitted from the at least one signal transmission module may be transmitted in a certain form. In addition, as the transmission signal is transmitted from a position in which the charging station 500 is provided, namely, from a fixed position of the charging station 500, a reception sensitivity of the transmission signal may vary depending on a position of the main body 10. That is, a reception result obtained by receiving the transmission signal may vary depending on a position in which the transmission signal is received, that is, a position of the main body 10. The robot 100 may determine a current position of the main body 10 based on the transmission signal, of which reception result varies depending on a position in which the transmission signal is received. For example, when the main body 10 travels from one point to another point, distances are measured between the charging station 500 and the main body 10 at the one point and the another point, respectively, based on the reception result obtained while the main body 10 travels from the one point to the another point, and it is determined that the main body 10 moved from the one point to the another point based on the measured distances. Thus, a current position of the main body 10 may be determined. In addition, when a plurality of transmission signals is transmitted, respective reception results obtained by receiving the plurality of transmission signals are different as the signal sensor module receives the plurality of transmission signals transmitted from different positions. Thus, a current position of the main body 10 may be determined by comparing the reception results obtained by receiving the plurality of transmission signals with each other.

In the robot 100, the sensing unit 13 may sense a magnetic field state at a position in which the main body 10 is located while traveling. The sensing unit 13 may sense a magnetic field state at a current position. The sensing unit 13 may sense at least one selected from a magnetic field direction and magnetic field strength at a point in which the main body 10 is located while traveling. The sensing unit 13 may include at least one magnetic field sensor that senses at least one selected from a magnetic field direction and magnetic field strength at a point in which the main body 10 is located. Thus, the sensing unit 13 may sense the magnetic field state at a current position while traveling. The sensing unit 13 may sense the magnetic field state in real time while traveling. Accordingly, the sensing unit 13 may sense the magnetic field state at each point in a path of the travel area 1000 via which the main body 10 travels.

The controller 20 of the robot 100 may determine a position of the main body 10 based on at least one selected from the reception result obtained by the receiver 12, the sensing result obtained by the sensing unit 13, and the area map, and control the driving unit 11 such that the main body 10 travels in the travel area 1000, to thereby control traveling of the main body 10. Here, the area map is a map of the travel area 1000, and an arrangement position of the charging station 500 and the boundary area 1200 may be designated on the area map. For example, the area map may be pre-stored in the data unit 14. The area map may be pre-generated according to at least one selected from a previous traveling history of the robot 100, a position of the charging station 500, and a user setting of the robot 100, and pre-stored in the robot 100. The controller 20 may determine a position of the charging station 500 and measure a distance between the main body 10 and the charging station 500 based on the reception result, and determine a current position of the main body 10 based on the measured distance. The controller 20 may determine a magnetic field state information at a current position of the main body 10 based on the sensing result. Thus, a particular point in the travel area 1000 may be searched/identified. For example, if the main body 10 is located at a point x, magnetic field state information at the point x may be determined and stored based on the sensing result at the point x, and the stored magnetic field state information is compared with a sensing result at a current position to thereby search/identify whether the current position corresponds to the point x. Accordingly, based on the sensing result, a position of the travel area 100 may be determined or position information of the travel area 100 may be converted into a coordinate. In addition, the controller 20 may further measure a distance for which the main body 10 has traveled, based on at least one selected from a sensing result obtained by the sensing unit 13 and a communication result obtained by the communication unit 18, and determine a current position of the main body 10 based on the measured distance. The controller 20 may control driving of the driving unit 11 such that the main body 10 travels in the travel area 1000 according to the determined current position. That is, according to the determined current position, the controller 20 may control traveling of the main body 10 by controlling driving of the main body 10, so that the main body 10 does not deviate from the boundary area 1200. The controller 20 may also control operation of the main body 10 such that the main body 10 performs set (or predetermined) operation.

The robot 100 may be docked at the charging station 500 to (re)charge power.

Hereinafter, embodiments of the charging station 500 will be described.

Figure 8:
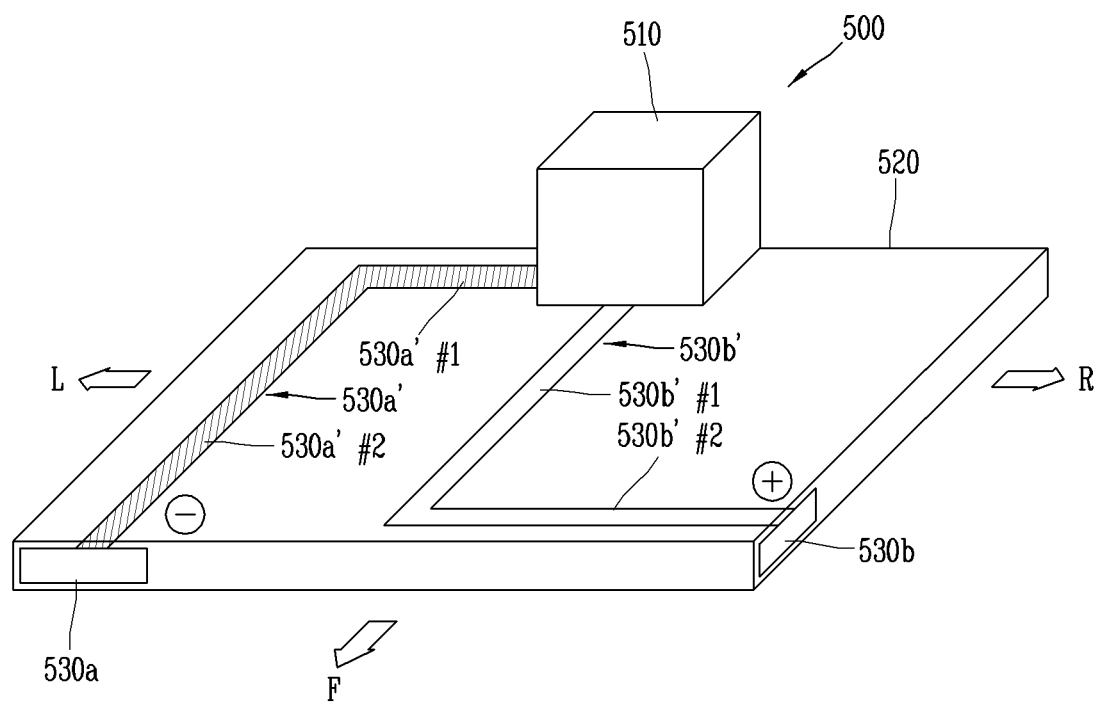
FIG. 8 is a diagram illustrating one example of a charging station of a moving robot according to an embodiment.
Figure 9:
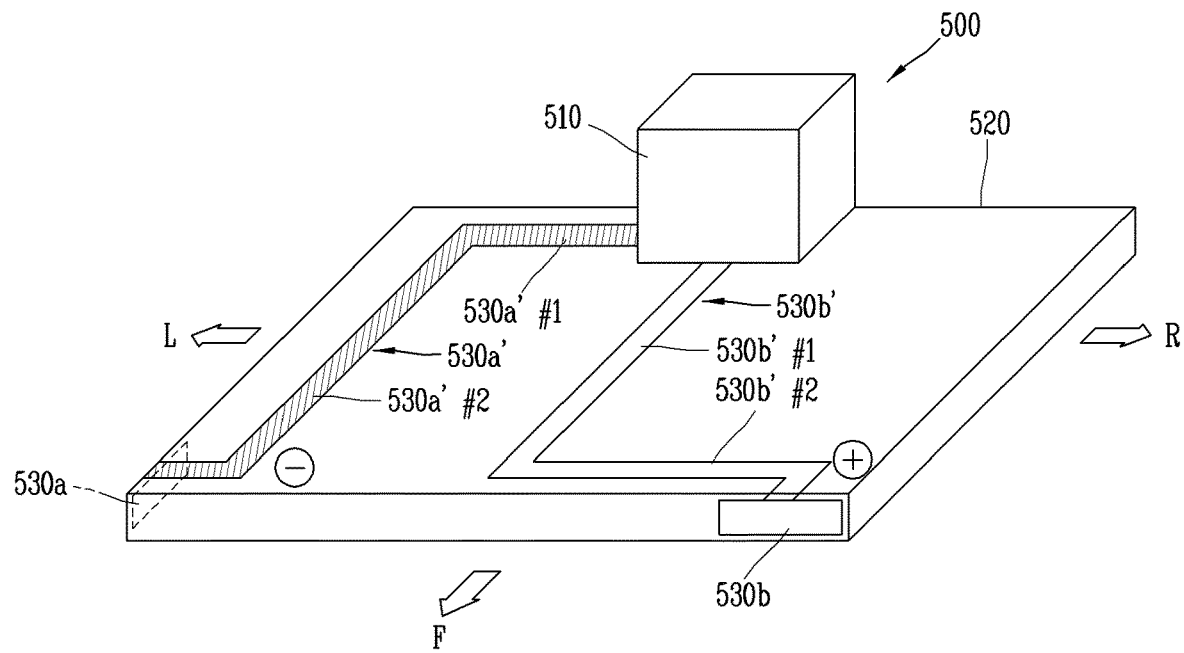
FIG. 9 is a diagram illustrating another example of a charging station of a moving robot according to an embodiment.

The charging station 500, as illustrated in FIG. 8 or FIG. 9, a charging unit 510 for (re)charging the robot 100, a docking base 520 at which the robot 100 is docked, and a connection (or connecting) portion 530 to which one end and another end of the boundary wire 1200 defining the boundary of the travel area 1000 are connected, so as to cause a current to be induced in the boundary wire 1200.

As the charging unit 510 is provided at an upper portion of the docking base 520, the charging unit 510 is electrically connected to the robot 100 while being docked at the docking base 520, allowing the robot 100 to be (re)charged.

The docking base 520 may include the connection portion 530 to define a bottom surface of the charging station 500, allowing the robot 100 to be docked therewith.

The connection portion 530, which is included in the docking base 520, may be connected to the one end and the another end of the boundary wire 1200, so as to cause a current to be induced in the boundary wire 1200.

The robot 100 may be charged as the charging station 500 is provided with the charging unit 510, the docking base 520, and the connection portion 530. In the charging station 500 that causes the current to be induced in the boundary wire 1200, the connection portion 520 includes a first terminal 530a provided at a first surface of the docking base 520 so as to allow the one end of the boundary wire 1200 to be connected thereto, and a second terminal 530b provided at a second surface of the docking base 520 so as to allow the another end of the boundary wire 1200 to be connected thereto.

That is, as the first terminal 530a and the second terminal 530b are provided at the first surface and the second surface of the docking base 520, respectively, the first terminal 530a is connected to the one end of the boundary wire 1200 at the first surface of the docking base 520 and the second terminal 530b is connected to the another end of the boundary wire 1200 at the second surface of the docking base 520, allowing the charging station 500 and the boundary wire 1200 to be connected to each other.

Here, directions of the first surface and the second surface may be different.

In more detail, the first surface and the second surface may be at different directions from the docking base 520, so that the first terminal 530a and the second terminal 530b may be located at different directions.

The first surface may be any one of a front surface and a left surface of the docking base 520.

For example, referring to FIGS. 8 and 9, it may be the front surface or the left surface of the docking base 520.

Accordingly, the first terminal 530a may be provided at the front surface of the docking base 520 as illustrated in FIG. 8, or provided at the left surface of the docking base 520 as illustrated in FIG. 9.

When the first surface is the front surface of the docking base 520, the second surface may be a right surface of the docking base 520 as illustrated in FIG. 8.

Accordingly, the second terminal 530b may be provided at the right surface of the docking base 520 when the first terminal 530a is provided at the front surface of the docking base 520 as illustrated in FIG. 8.

When the first surface is the left surface of the docking base 520 as illustrated in FIG. 9, the second surface may be any one of the front surface and the right surface of the docking base 520.

That is, when the first terminal 530a is disposed at the left surface of the docking base 520 as shown in FIG. 9, the second terminal 530b may be provided at any one of the front surface and the right surface of the docking base 520.

As the first terminal 530a and the second terminal 530b are located at different directions of the docking base 520, the one end and the another end of the boundary wire 1200 may be connected in different directions.

The first terminal 530a is provided at the first surface so as to be connected to the one end of the boundary wire 1200, and the second terminal 530b is provided at the second surface so as to be connected to the another end of the boundary wire 1200.

The first terminal 530a and the second terminal 530b may be respectively provided at the first surface and the second surface of the docking base 520 to be adjacent to a front side or part F of the docking base 520.

For example, as illustrated in FIGS. 8 and 9, the first terminal 530a and the second terminal 530b may be provided at positions in a direction opposite to where the charging unit 510 is disposed, namely, the front side F.

That is, the first terminal 530a and the second terminal 530b may be respectively provided at the first surface and the second surface to be adjacent to the front part of the docking base 520.

The first terminal 530a and the second terminal 530b may be divided according to a polarity of the boundary wire 1200.

The first terminal 530a may correspond to a negative pole (−), and the second terminal 530b may correspond to a positive pole (+).

The negative pole (−) may correspond to the one end of the boundary wire 1200, and the positive pole (+) may correspond to the another end of the boundary wire 1200.

As the connection portion 530 having the first terminal 530a and the second terminal 530b located at the different directions of the docking base 520 may further include a first (electric) wire 530a' that connects the first terminal 530a and the charging unit 510, and a second (electric) wire 530b' that connects the second terminal 530b and the charging unit 510.

The first wire 530a' and the second wire 530b' may be wires that respectively provide electrical connection between the charging unit 510 and the first terminal 530a, and between the charging unit 510 and the second terminal 530b, so as to allow a current to be induced from the charging station 510 to the boundary wire 1200 connected to the first terminal 530a and second terminal 530b.

That is, the current may be transmitted to the boundary wire 1200 from the charging unit 510 through the first wire 530a' and the second wire 530b'.

The first wire 530a' and the second wire 530b' may be embedded in the docking base 520 to provide electrical connection between the charging unit 510 and the first terminal 530a, and between the charging unit 510 and the second terminal 530b.

The first wire 530a' and the second wire 530b' may be built in the docking base 520 without being overlapped on the same plane.

For example, as illustrated in FIGS. 8 and 9, they may be divided and embedded in the docking base 520 without being overlapped on the same plane.

Accordingly, when the main body 10 is traveling on the docking base 520, the controller 40 may sense respective currents flowing in the first wire 530a' and the second wire 530b' in a separate or distinguishable manner, and thus a built-in path of the first wire 530a' and a built-in path of the second wire 530b' may be distinguished.

The first wire 530a' may be embedded along an edge of the docking base 520, from the left surface of the charging base 510 to the first terminal 530a.

For example, as illustrated in FIGS. 8 and 9, the first wire 530' may be embedded along a left part (edge) of the docking base 520 so as to be connected to the first terminal 530a provided at the first surface.

The first wire 530a', installed from the left surface of the charging unit 510 to the first terminal 530a along the edge of the docking base 520, may include a $1\text{-}1^{th}$ wire portion 530a'#1 extending in a first direction, and a $1\text{-}2^{th}$ wire portion 530a'#2 extending in a second direction crossing the first direction. Here, the first direction may be a direction toward a left side of the docking base 520, and a second direction may be a direction toward the front side of the docking base 520.

The $1\text{-}1^{th}$ wire portion 530a'#1 may extend along an edge of a surface of the docking base 520 where the charging unit 510 is located.

The $1\text{-}1^{th}$ wire portion 530a'#1 may extend in the first direction, from a left surface of the charging unit 510 to a point intersecting the $1\text{-}2^{th}$ wire portion 530a'#2.

The $1\text{-}2^{th}$ wire portion 530a'#2 may extend along an edge of the left side of the docking base 520.

The $1\text{-}2^{th}$ wire portion 530a'#2 may extend in the second direction, from a point intersecting the $1\text{-}1^{th}$ wire portion 530a'#1 to the first terminal 530a.

The $1\text{-}1^{th}$ wire portion 530a'#1 and the $1\text{-}2^{th}$ wire portion 530a'#2 may be straightly (or linearly) installed.

The $1\text{-}1^{th}$ wire portion 530a'#1 and the $1\text{-}2^{th}$ wire portion 530a'#2 may intersect at a specific angle.

For example, they may cross at right angles as illustrated in FIGS. 8 and 9.

That is, the first wire 530a' includes at least two or more wire portions, and may be embedded in the docking base 520 to have the shortest length (or distance) from the charging unit 510 to the first terminal 530a.

The second wire 530b' may be embedded along a central part (or portion) and an edge of the docking base 520, from a front surface of the charging unit 510 to the second terminal 530b.

For example, as illustrated in FIGS. 8 and 9, the second wire 530b' may be embedded along the central part and the front part of the docking base 520 so as to be connected to the second terminal 530b provided at the second surface.

The second wire 530b', installed from the front surface of the charging unit 510 to the second terminal 530b along the central part and the edge of the docking base 520, may include a $2\text{-}1^{th}$ wire portion 530b'#1 extending in the second direction and a $2\text{-}2^{th}$ wire portion 530b'#2 extending in a third direction crossing the second direction.

Here, the second direction may be a direction toward the front side of the docking base 520, and the third direction may be a direction toward a right side of the docking base 520.

The $2\text{-}1^{th}$ wire portion 530b'#1 may extend along a central part of the of the docking base 520 where the charging unit 510 is located.

The $2\text{-}1^{th}$ wire portion 530b'#1 may extend in the second direction, from the central part of the charging unit 510 to a point intersecting the $2\text{-}2^{th}$ wire portion 530b'#2.

The $2\text{-}2^{th}$ wire portion 530b'#2 may extend along an edge of the front side of the docking base 520.

The $2\text{-}2^{th}$ wire portion 530b'#2 may extend in the third direction, from a point intersecting the $2\text{-}1^{th}$ wire portion 530b'#1 to the second terminal 530b.

The $2\text{-}1^{th}$ wire portion 530b'#1 and the $2\text{-}2^{th}$ wire portion 530b'#2 may be straightly (or linearly) installed.

The $2\text{-}1^{th}$ wire portion 530b'#1 and the $2\text{-}2^{th}$ wire portion 530b'#2 may intersect at a specific angle.

For example, they may cross at right angles as illustrated in FIGS. 8 and 9.

That is, the second wire portion 530b' is made up of at least two or more wire portions, and may be embedded in the docking base 520 to have the shortest length (or path) from the charging unit 510 to the second terminal 530b.

Figure 10:
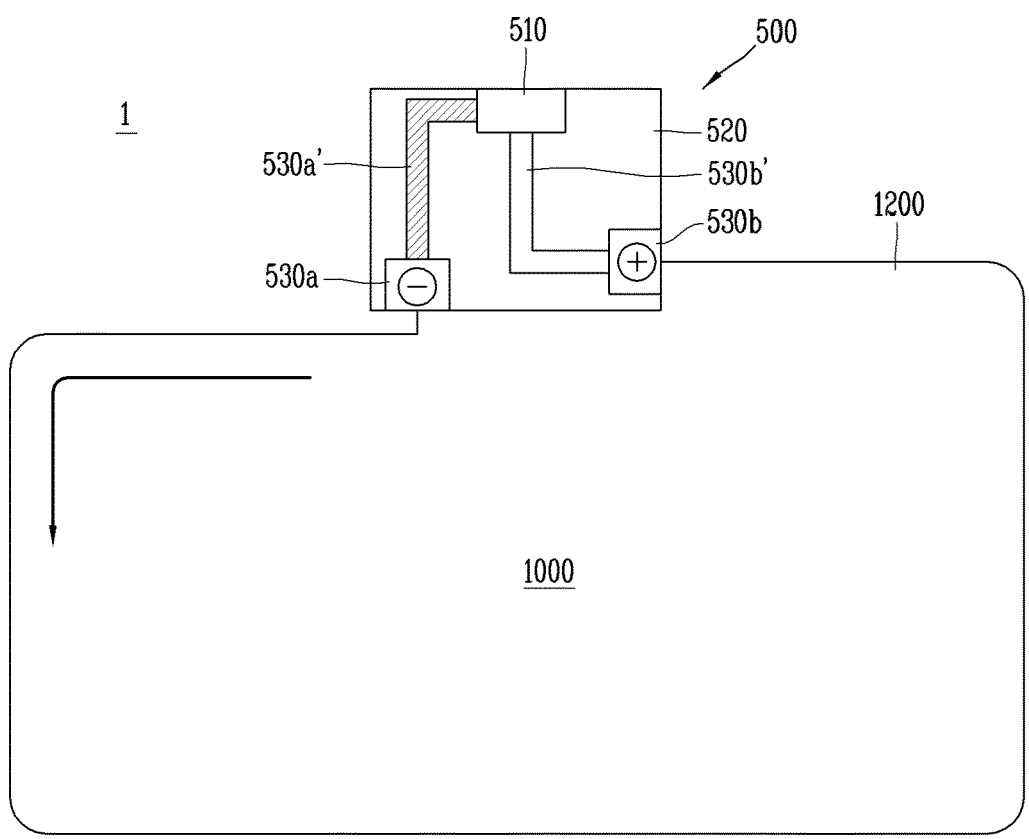
FIG. 10 is an exemplary view illustrating a specific connection relationship between a boundary wire and a charging station of a moving robot according to an embodiment.

The charging station 500 may be connected to the boundary wire 1200 defining the boundary of the travel area 1000 in a moving robot system 1 of FIG. 10.

Hereinafter, embodiments of the moving robot system 1 (hereinafter, "system") according to the present disclosure will be described.

The system 1 may refer to a system for travelling and (re)charging of the robot 100 in the travel area 1000.

As illustrated in FIG. 10, the system 1 includes the boundary wire 1200 installed along a boundary of the travel area 1000 to define the boundary of the travel area 100, the charging station 500 connected to one end and another end of the boundary wire 1200 so as to cause a current to be induced in the boundary wire 1200, and the robot 100 traveling in the travel area 1000 based on a result of sensing the current while traveling in the travel area 1000.

In the system 1, the one end and the another end of the boundary wire 1200 are connected to the charging station 500 in different directions.

That is, the boundary wire 1200 may be connected to the charging station 500 from any two different directions.

The charging station 500 may include the charging unit 510 that (re)charges the robot 100 during docking, the docking base 520 at which the robot 100 is docked, and the connection portion 530 to which the one end and the another end of the boundary wire 1200 are connected.

Here, the connection portion 530 may include the first terminal 530a provided at a first surface of the docking base 520 and connected to the one end of the boundary wire 1200 at the first surface, the first wire 530a' that connects the first terminal 530a and the charging unit 510, the second terminal 530b provided at a second surface of the docking base 520 and connected to the another end of the boundary wire 1200 at the second surface, and the second wire 530b' that connects the second terminal 530b and the charging unit 510.

The first terminal 530a may be connected to the one end that corresponds to a negative pole (−) of the boundary wire 1200, and the second terminal 530b may be connected to the another end that corresponds to a positive pole (+) of the boundary wire 1200.

The first wire 530a' and the second wire 530b' may allow the current to be induced from the charging unit 510 to the boundary wire 1200 connected to the first terminal 530a and the second terminal 530b.

The first wire 530a' and the second wire 530b' are embedded in the docking base 520 without being overlapped with each other, so as to allow the robot 100 to sense respective currents flowing in the first wire 530a' and the second wire 530b' in a separate manner.

As the first wire 530a' and the second wire 530b' are included in the connection portion 530, the robot 100 may move to the charging unit 510 along a built-in path of the second wire 530b' for docking at the charging station 500.

That is, as the second wire 530b' is embedded in the docking base 520 in a manner of extending from the front surface of the charging unit 510, as illustrated in FIG. 10, the robot 100 may move to the front side of the charging unit 510 along the built-in path of the second wire 530b' based on a result of sensing the current flowing in the second wire 530b'.

Accordingly, the robot 100 may accurately move to the charging unit 510 for docking.

As illustrated in FIG. 10, in the system 1 in which the boundary wire 1200 is connected to the first terminal 530a and the second terminal 530b provided at different directions of the charging station 500, the robot 100 that is docked at the charging station 500 may travel again from the first terminal 530a to the second terminal 530b.

The robot 100 may sense the current flowing in the boundary wire 1200 to recognize the boundary of the travel area 1000 based on a sensing result, and travel in a direction toward the second terminal 530b from the first terminal 530a based on a recognition result.

Here, the robot 100 may travel in a counterclockwise direction as illustrated in FIG. 10.

The robot 100, after the one end and the another end of the boundary wire 1200 are connected to the charging station 500, may travel from the first terminal 530a to the second terminal 530b along the boundary wire 1200 based on the current sensing result, and generate map information based on a traveling result.

For example, when the robot 100 initially travels after the charging station 500 and the boundary wire 1200 are connected to each other, namely, when the system 1 for generating the map information initially runs, the robot 100 may recognize the boundary of the travel area 1000 based on the current sensing result, so as to generate the map information while traveling along the boundary wire 1200.

While traveling from the first terminal 530a to the second terminal 530b, the robot 100 may detect a connection state between the boundary wire 1200 and the terminal station 500 based on at least one of the result of sensing the current and a result of recognizing a traveling direction.

That is, the robot 100 may determine the connection state between the boundary wire 1200 and the charging station 500 while traveling along the boundary wire 1200 based on the current sensing result.

When at least one of the current sensing result and the traveling direction recognition result does not satisfy a preset (or predetermined) state reference, the robot 100 may detect that there is a connection problem or error.

The state reference may be a reference for a traveling direction of the robot 100 when traveling from the first terminal 530a to the second terminal 530b.

The state reference may be set based on when the boundary wire 1200 and the charging station 500 are correctly or properly connected to each other.

For example, it may be set as a counterclockwise direction.

In this case, while the robot 100 is traveling from the first terminal 530a to the second terminal 530b along the boundary wire 1200, when the traveling direction is recognized as a counterclockwise direction, the robot 100 may determine that there is no problem in the connection state, whereas when the traveling direction is detected as a clockwise direction, the robot 100 may determine that there is a problem in the connection state.

Figure 11:
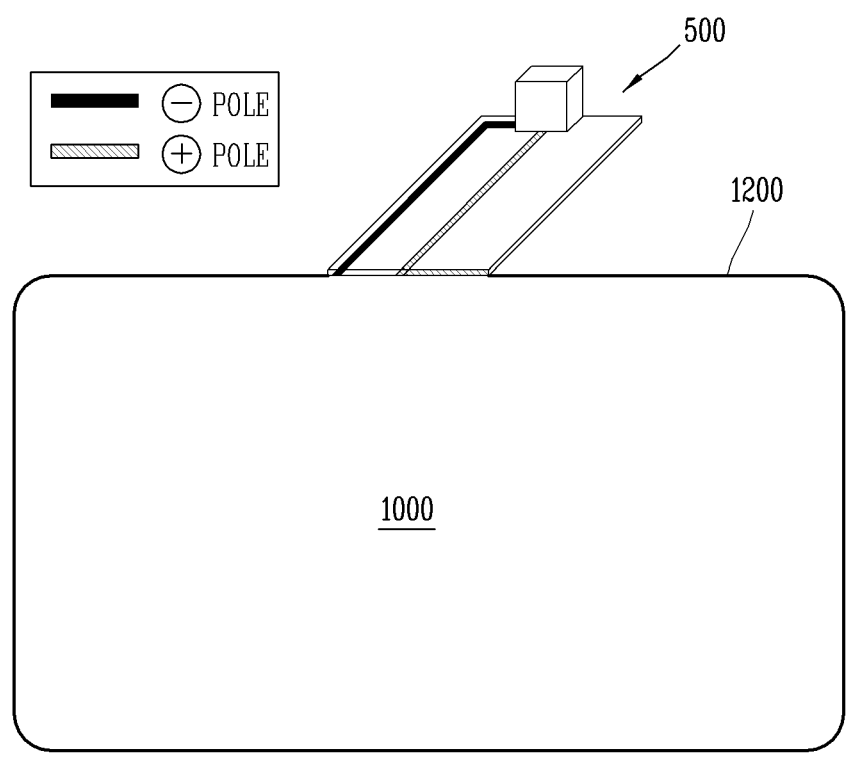
FIG. 11 is a diagram illustrating an example of wiring between a boundary wire and a charging station of a moving robot, and a travel area according to an embodiment.
Figure 12A:
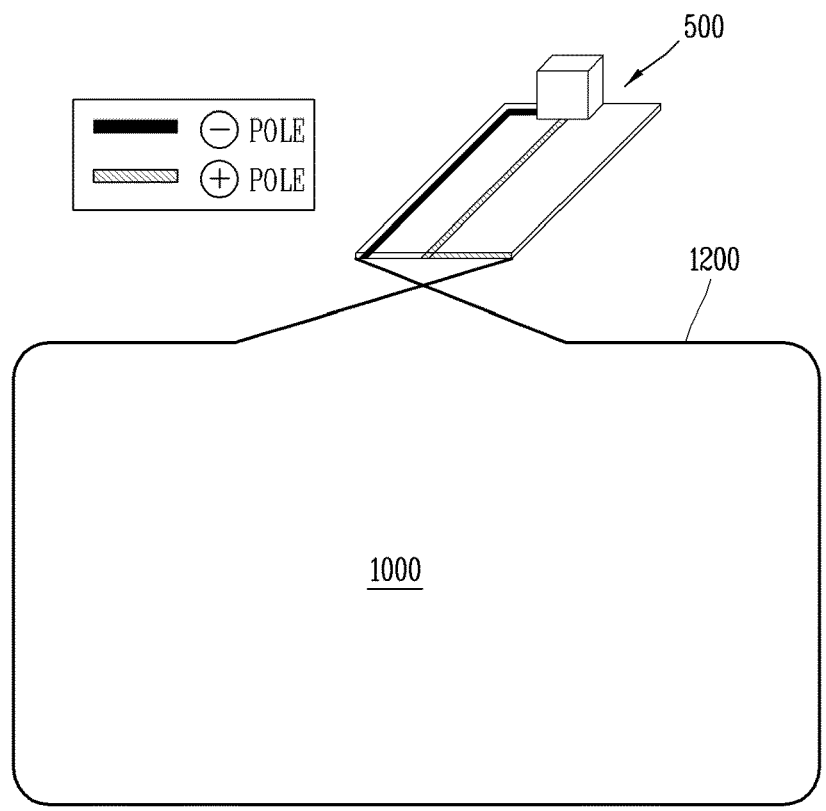
FIG. 12A is a diagram illustrating an example of miswiring between a boundary wire and a charging station of a moving robot, and a travel area according to an embodiment.
Figure 12B:
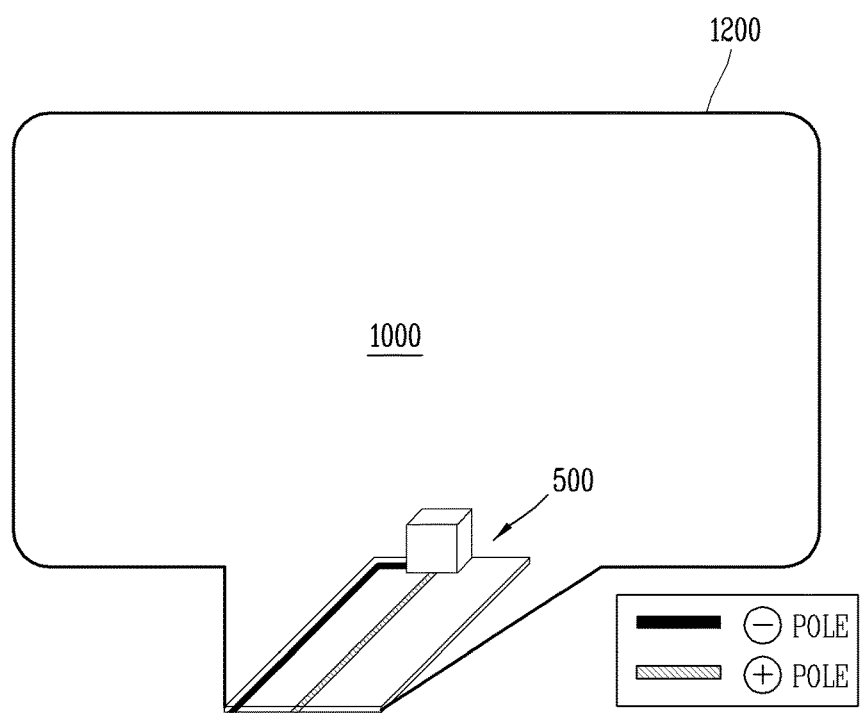
FIG. 12B is a diagram illustrating another example of miswiring between a boundary wire and a charging station of a moving robot, and a travel area according to an embodiment.
Figure 12C:
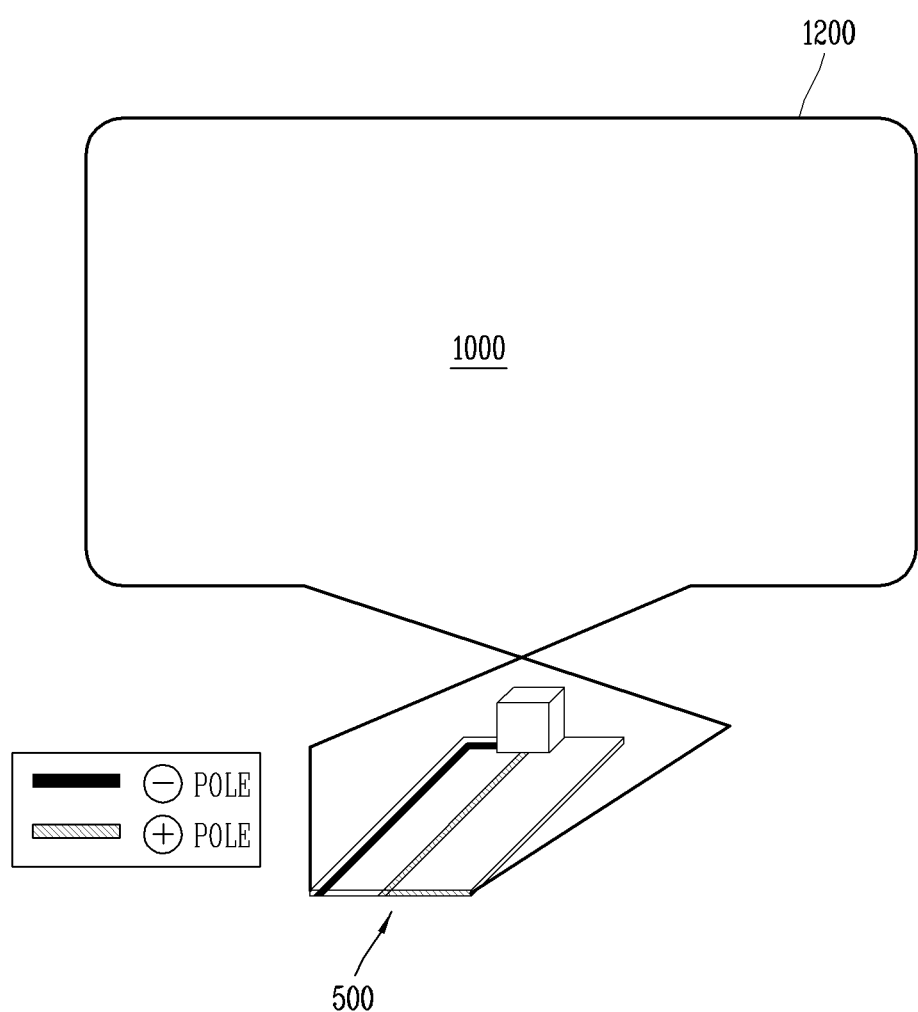
FIG. 12C is a diagram illustrating yet another example of miswiring between a boundary wire and a charging station of a moving robot, and a travel area according to an embodiment.

More specifically, when the boundary wire 1200 and the charging station 500 are connected as illustrated in FIG. 11, traveling from the first terminal 530a to the second terminal 530b is performed in the counterclockwise direction, and thus the robot 100 may detect that the connection state is correct. When the boundary wire 1200 and the charging station 500 are connected as illustrated in FIGS. 12A, 12B, and 12C, traveling from the first terminal 530a to the second terminal 530b is not performed in the counterclockwise direction, and thus the robot 100 may detect that the connection state is incorrect.

When it is detected as the incorrect connection state, the robot 100 may output a notification regarding the connection error.

For example, a notification signal for the connection problem may be output through the input/output unit 15, or information regarding the connection error may be transmitted to the terminal 300 through the communication unit 18.

The above-described embodiments of the charging station of the moving robot and the moving robot system may be implemented independently, or in a combination of one or more embodiments. In addition, the embodiments may be applied to a charging station of a moving robot or a charging system of a moving robot, in a combination of specific embodiments. In particular, the embodiments may be usefully applied to a lawn mowing robot, a lawn mowing robot system, and a charging station of a lawn mowing robot, and the like.

Therefore, it should be understood that the above-described implementations are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

What is claimed is:

1. A charging station of a moving robot, comprising:
   a charging unit configured to charge the moving robot;

a docking base configured to dock the moving robot during charging; and a connection portion to which a first end and a second end of a boundary wire are connected such that a current is configured to be induced in the boundary wire, wherein the boundary wire defines a boundary of a travel area of the moving robot, wherein the connection portion comprises:

a first terminal provided at a first surface of the docking base and configured to allow the first end of the boundary wire to be connected thereto; and a second terminal provided at a second surface of the docking base and configured to allow the second end of the boundary wire to be connected thereto, wherein the connection portion further comprises:

a first wire that connects the first terminal and the charging unit; and a second wire that connects the second terminal and the charging unit, and wherein the first wire and the second wire are embedded in the docking base without being overlapped on the same plane.

2. The charging station of claim 1, wherein a direction of the first surface and a direction of the second surface are different.

3. The charging station of claim 2, wherein the first surface is any one of a front surface and a left surface of the docking base.

4. The charging station of claim 3, wherein the second surface is a right surface of the docking base when the first surface is the front surface of the docking base.

5. The charging station of claim 3, wherein the second surface is any one of the front surface and a right surface of the docking base when the first surface is the left surface of the docking base.

6. The charging station of claim 1, wherein the first terminal corresponds to a negative pole (−) and the second terminal corresponds to a positive pole (+).

7. The charging station of claim 6, wherein the first terminal and the second terminal are respectively provided at the first surface and the second surface, and wherein the first and second surfaces are adjacent to a front part of the docking base.

8. The charging station of claim 1, wherein the first wire is embedded along an edge of the docking base, from a left surface of the charging unit to the first terminal.

9. The charging station of claim 8, wherein the first wire comprises:

a first wire portion extending in a first direction; and a second wire portion extending in a second direction intersecting the first direction.

10. The charging station of claim 1, wherein the second wire is embedded along a central part and an edge of the docking base, from a front surface of the charging unit to the second terminal.

11. The charging station of claim 10, wherein the second wire comprises:

a third wire portion extending in a second direction; and a fourth wire portion extending in a third direction intersecting the second direction.

12. A moving robot system, comprising:

a boundary wire installed along a boundary of a travel area of a moving robot;

a charging station to which a first end and a second end of the boundary wire are connected such that a current is configured to be induced in the boundary wire; and the moving robot configured to travel in the travel area based on a result of sensing the current while traveling;

wherein the first end and the second end of the boundary wire extend in different directions from the charging station, wherein the charging station comprises:

a charging unit a docking base; and a connection portion to which the first end and the second end of the boundary wire are connected, wherein the connection portion includes:

a first terminal provided at a first surface of the docking base so as to allow the first end of the boundary wire to be connected thereto;

a first wire that connects to the first terminal and the charging unit a second terminal provided at a second surface of the docking base so as to allow the second end of the boundary wire to be connected thereto; and a second wire that connects to the second terminal and the charging unit, and wherein the first wire and the second wire are embedded in the docking base without being overlapped on the same plane.

13. The system of claim 12, wherein the charging unit is configured to charge the moving robot, and wherein the docking base is configured to dock the moving robot during charging.

14. The system of claim 13, wherein the moving robot is configured to move to the charging unit along a path of the second wire for docking at the charging station.

15. The system of claim 12, wherein after the first end and the second end of the boundary wire are connected to the charging station, the moving robot is configured to travel from the first terminal to the second terminal along the boundary wire based on sensing current in the boundary wire, so as to generate map information based on a traveling result.

16. The system of claim 15, wherein the moving robot is configured to detect a connection state between the boundary wire and the charging station based on at least one of sensing current in the boundary wire, and recognizing a traveling direction while traveling from the first terminal to the second terminal along the boundary wire.

17. The system of claim 16, wherein the moving robot is configured to detect a problem in the connection state when at least one of sensing current in the boundary wire, and recognizing the traveling direction does not satisfy a preset state reference.

18. The system of claim 17, wherein when the connection state problem is detected, the moving robot is configured to output a notification regarding the connection state problem.

* * * * *